(12) United States Patent
Joffe et al.

(10) Patent No.: US 6,888,896 B1
(45) Date of Patent: May 3, 2005

(54) METHOD AND APPARATUS FOR REDUCING FLUX IMBALANCE SIGNAL DISTORTION IN A DATA COMMUNICATIONS SYSTEM

(75) Inventors: Daniel M. Joffe, Huntsville, AL (US); Richard L. Goodson, Huntsville, AL (US); Curtis W. Dodd, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/527,162

(22) Filed: Mar. 17, 2000

(51) Int. Cl.[7] ................................................ H04B 3/00
(52) U.S. Cl. ...................... 375/258; 375/220; 375/222; 375/257; 375/219
(58) Field of Search ................................ 330/149, 188; 375/258, 257, 220, 222, 219

(56) References Cited

U.S. PATENT DOCUMENTS

| | | | | |
|---|---|---|---|---|
| 3,881,149 A | * | 4/1975 | Kiko ........................... | 323/356 |
| 4,614,914 A | * | 9/1986 | Hofer .......................... | 330/149 |
| 6,018,529 A | | 1/2000 | Toth ............................ | 370/463 |
| 6,067,316 A | * | 5/2000 | Amrany et al. ............. | 375/220 |
| 6,522,688 B1 | * | 2/2003 | Dowling ..................... | 375/222 |

* cited by examiner

*Primary Examiner*—Shuwang Liu
(74) *Attorney, Agent, or Firm*—Waddey & Patterson, P.C.; I. C. Waddey, Jr.

(57) ABSTRACT

A method and apparatus for reducing signal distortion in a high speed data communications system caused by a flux imbalance in a system coupling transformer. The signal distortion is monitored by a combination echo canceller circuit connected to the equipment side winding of the transformer, thereby generating an error signal. Changes in the error signal are used by a flux controller to provide a flux cancellation signal. The flux cancellation signal is added with the data signal to generate an offsetting flux signal to the transformer.

27 Claims, 7 Drawing Sheets

Line interface arrangement

Data Communication System with Simplex Powering Arrangement

Principle of operation of flux canceller

Line interface arrangement

Data Mode Arrangement

METHOD AND APPARATUS FOR REDUCING FLUX IMBALANCE SIGNAL DISTORTION IN A DATA COMMUNICATIONS SYSTEM

BACKGROUND OF THE INVENTION

The present invention relates in general to communications systems, and is more particularly directed to a simplex power feeding arrangement for furnishing power from a central location to a remote location in a high-speed data communications system.

This invention is directed towards the reduction of distortion in the signal transfer from the central location to the remote location that may be caused by a flux imbalance in the coupling transformers. This flux imbalance can cause a reduction of the data transmission rates in high-speed communication systems.

Simplex power feeding arrangements, by their nature, cause very little additional net DC flux density in a transformer. Typically, only an imbalance in the ampere-turns product of each half of the line-side transformer windings causes an undesirable additional DC flux density sometimes referred to as a flux imbalance. However, as transformers become smaller and data signal constellations have an increasing number of points, even a slight flux imbalance may cause significant and undesirable distortion in transmission signals. This distortion produces the most negative effect in echo-cancelled systems, where the local transmitter signal must be precisely cancelled to allow error-free reception of the remote signal. Distortion-free coupling of the local signal makes cancellation a relatively simple linear process, as compared to a complex non-linear process that might otherwise be required. Hence, there is a need for a way to counteract the imbalance in the transformer and thereby remove or reduce the distortion or non-linearity.

The problem of distortion caused by the flux imbalance may be solved if there is a way to counteract the magnetomotive force that produces the imbalance. Such a solution could achieve near maximum linearity while maintaining minimum size components.

In order to understand the benefits of a simplex powering apparatus and the flux imbalance problem it is useful to review a data communication system 100 shown in FIG. 1 with a simplex powering arrangement. The data communication system 100 utilizes a line powering supply 105 that may be located at a central location 96 of the communication system 100. This line powering supply 105 transfers power via communication lines 108, 109 to a power supply 106 at a remote location 98. The communication lines 108, 109 are typically twisted pair lines. The power supply 106 at the remote location 98 provides power to remote data communications equipment, such as transceivers 110 and 112, or other data communications devices.

Although variations in the electrical characteristics of each coupling transformer 121, 122, 123, 124 or lines 108, 109 connecting the central location 96 to the remote location 98 are small, slight variations may cause a net DC flux density. This net DC flux density produces distortion in data communication system 100 having small transformers 121, 122, 123, 124. Modulation methods with a large number of constellation points may be affected to a greater extent by the distortion caused by the net DC flux density imbalance. In echo-cancelled systems with a large number of constellation points, the need for linearity is greatest. A highly linear system affords a relatively easy linear cancellation of the near-end signal, as opposed to a relatively difficult non-linear cancellation. Although a larger transformer may reduce the distortion problem, continual market pressure exists to make electronic communication devices smaller while increasing the data rate and therefore the need for constellations with a large number of points. Hence, there is a need for a method of removing the flux imbalance and allowing for the use of smaller sized magnetic devices such as transformers while maintaining or improving performance caused by the distortion due to flux imbalance.

SUMMARY OF THE INVENTION

One object of the present invention is to reduce the DC flux density in the magnetics of a transformer in a simplex power feeding arrangement such that the net DC flux density approaches zero without adding significant complexity or size to coupling transformers of transceivers used in a communication system.

A further object is to provide a reduction in the DC flux imbalance that is adaptable to variations in transformer and line characteristics.

Yet another object of the present invention is to minimize the flux imbalance that may be generated as a consequence of non-idealities within the electrical circuits of the transmitter, such as by an offset voltage in an output amplifier.

An apparatus in a transceiver meeting the above and other objects is comprised of a means for measuring signal quality combined with a DC current injection means. The signal quality measuring means is comprised of a sampler and signal quality calculator. In a first embodiment, the sampler monitors the output of an echo canceller during simplex transmission and the quality calculator determines the average magnitude of the output of the echo canceller and then directs the DC injection means to add a flux cancellation signal to the transmit signal in accordance with a flux cancellation algorithm. The flux cancellation signal and transmit signal are digital values and are converted to an analog signal, via a D/A converter, before going to an output amplifier. The flux canceller algorithm increases or decreases the flux canceller signal to reduce the value of the average magnitude of the output of the echo canceller.

The apparatus may be modified to provide for cancellation of the imbalance during a full duplex data mode by using an error signal from a linear equalizer as an input to the distortion measuring means.

A method for minimizing the distortion due to flux imbalance comprises the steps of: measuring the quality of the signal; injecting a DC current in an equipment side winding of a coupling transformer; measuring the quality again; increasing the injected DC current if quality has improved else decreasing the injected DC current; and repeating the above steps thereby reducing the distortion caused by flux imbalance.

DESCRIPTION OF THE PREFERRED EMBODIMENTS

Figure 1:
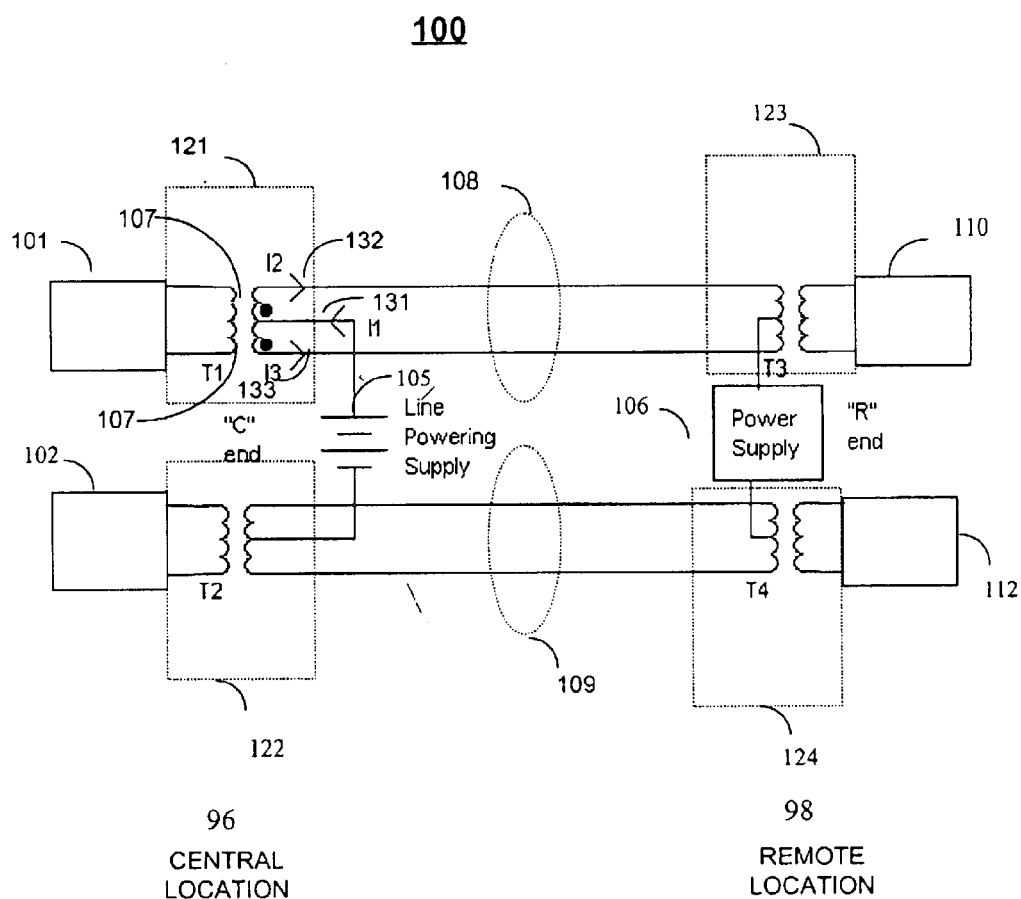
FIG. 1 is a schematic drawing of conventional simplex power arrangement used in a high speed communications system.
Figure 2:
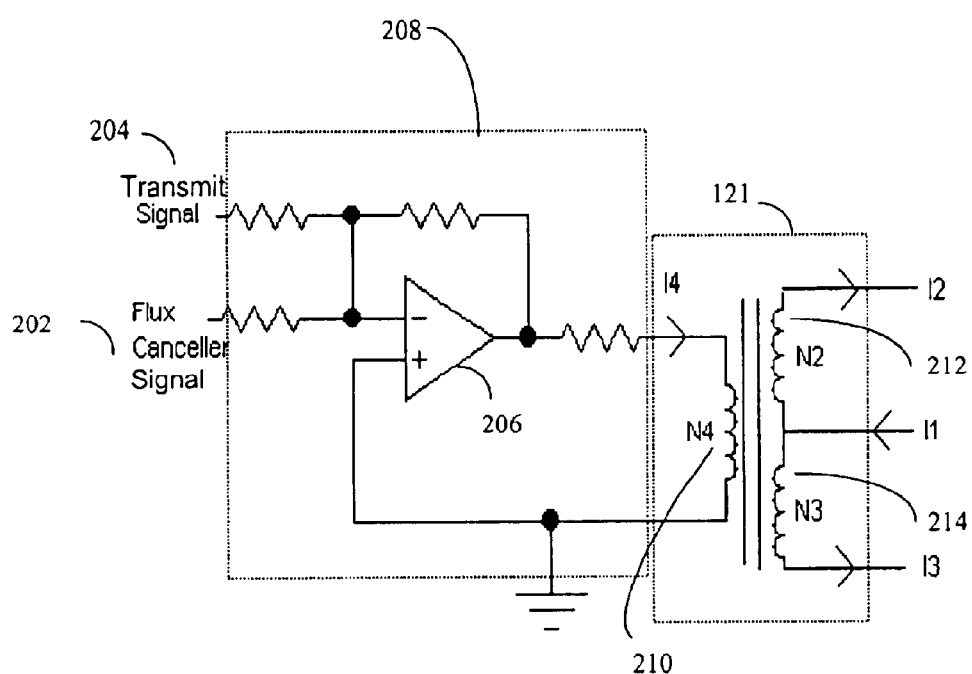
FIG. 2 is a schematic diagram of a summing amplifier for furnishing a flux cancellation voltage in accordance with the present invention.

Referring first to a simplex power feeding arrangement shown in the high speed communication system 100 of FIG. 1, the signal distortion problem associated with a net DC flux density can be understood. Line power and communication signals are often transmitted over two pairs of wires 108, 109 in the communication system 100 with a simplex powering arrangement. A central transceiver 101 and central transceiver 102 at a central location are coupled to a remote transceiver 110 and remote transceiver 112 over the communication lines 108, 109. A line powering supply 105 at the central location furnishes DC current to a remote power supply 106 at the remote location. The remote power supply 106 furnishes power to the remote transceiver 110 and remote transceiver 112. The simplex powering arrangement has the advantage that the DC current furnished by the line powering supply 105 produces nearly equal and opposite flux densities in a first transformer 121 as illustrated in FIG. 1. Current I1 from the line powering supply 105 splits into two components, i2 and I3. If I2 and I3 are exactly equal and the number of turns in the I2 half or top side of the first transformer 121 is the same as the number of turns in the I3 half or bottom side of first transformer 121, then no net DC flux density is produced in the first transformer 121. As shown by the dots 107 on first transformer 121, I2 flows out of a non-dotted end, and I3 flows out of a dotted end. The dot notation is a standard and well-known convention for showing opposite signs in ampere-turns, or magneto-motive force. To the extent that I2 and I3 do not exactly match, or that the number of turns in the first transformer 121 winding halves (N2 and N3 as shown in FIG. 2) are not exactly equal, there will be a net DC flux density. For example, the currents I2 and I3 will not match if the resistance of the I2 path is not equal to the resistance seen by the I3 path. This net flux density can cause distortion problems for the communication system 100.

The net flux density, also referred to as an uncancelled flux density, caused by the ampere-turn imbalance can be compensated or essentially removed by generating a compensating flux density in accordance with the present invention. The compensating flux density would be equal and opposite to the DC flux density produced by currents I2 and I3. The end result of the combination of the uncancelled flux density and the compensating flux density in accordance with the present invention is a DC flux density in first transformer 121 much closer to zero. Typically, when the DC flux density is essentially zero then distortion in first transformer 121 is minimized. FIG. 1 also shows that a return path for current I1 is provided through the third transformer 123, fourth transformer 124, second communication line 109, and second transformer 122.

FIG. 2 illustrates details of the first transformer 121, the amplifier 208, and the connections for other components for providing the compensating flux density. This compensating flux density is used to offset or cancel the uncancelled flux densities due to imbalances in currents I2, I3, and the windings N2, N3, and N4. By adding a flux canceller signal 202, which comprises a varying voltage signal, to the summer amplifier 208 there is provided an additional degree of freedom to assure that the net DC flux in the transformer 121 is zero as expressed by the equation:

$$I2 \cdot N2 - I3 \cdot N3 + I4 \cdot N4 = 0$$

In the ideal case, I2*N2 and I3*N3 are equal and there is no need for a flux canceller signal or the ampere-turns expression I4*N4 of the equation. The line side transformer windings N2 and N3 are on the line side of the transformer 121 and the equipment side winding N4 is on the transmitter side of the transformer 121. The currents I2 and I3 are typically DC currents but may contain small variations with time as conditions change, such as a change in line characteristics due to temperature change. In the above equation, the flux canceller signal is used to cancel whatever uncancelled flux remains in order to minimize the transformer distortion due to flux imbalance.

Now that a concept for a method and apparatus has been disclosed for minimizing flux density and thereby minimizing distortion, details of a method and a preferred embodiment will be given. Further, an apparatus for measuring distortion and selecting a value for the flux canceller signal is also described.

Figure 3:
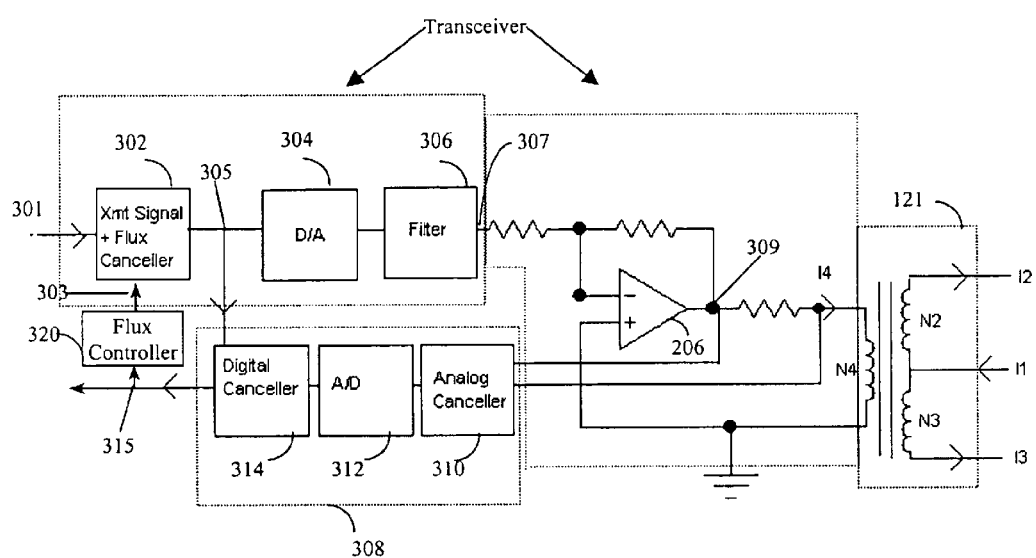
FIG. 3 is a schematic and block diagram of a first embodiment of an apparatus for flux cancellation in accordance with the present invention.

FIG. 3 is a schematic and block diagram of the transceiver and transformer sections of a typical full-duplex echo cancelled data transmission system 100 (FIG. 1). The transceiver may also be used in a simplex mode, such as during a training mode. The transceiver includes a flux generator circuit formed by the combination of a signal summer 302, a D/A converter 304, a filter 306, and amplifier 206. A digital transmit signal 301 enters a summer 302. The summer 302 adds the digital transmit signal 301 with a flux cancellation signal 303 to form a digital transformer signal 305. The digital transformer signal 305 is converted by digital to analog converter 304 and analog filter 306 to an analog transformer input signal 307. The analog transformer input signal 307 is then processed through amplifier 206 to form amplified transformer signal 309. The amplified transformer signal 309 is then sent to the equipment-side winding N4 in the transformer 121. The winding N4 in the transformer 121 converts the amplified transformer signal 309 into a transmitter signal, which includes a cancellation flux. The cancellation flux offsets the flux imbalance in the transformer to reduce or eliminate the flux imbalance. The use of a transformer winding to create flux is well known in the prior art.

The amplified transformer signal 309 is also sent to a combination echo canceller 308, which includes an analog echo canceller 310 followed by an analog to digital converter 312 and digital echo canceller 314. The combination echo canceller 308 is provided to cancel the near-end signal so that only the far-end signal and whatever nonlinear portion of the near-end signal remain. When the data transmission system 100 is operating in the simplex mode, the far-end signal is non-existent or zero. The combination echo canceller 308 is well known and understood by those skilled in the art of telecommunications and thus, no further comments will be given on this aspect of the invention.

Typical echo cancellers 310, 314 function as linear cancellers. These typical cancellers pass do not cancel non-linear echo components, such as those generated in transformer non-linearities such as flux imbalances. Thus, the flux imbalance detection signals are not removed from the transformer signal. Therefore, the echo cancellers generate a detected quality signal that includes indications of the flux imbalance in the transformer. These uncancelled signals represent a distortion in the telecommunication system. Accordingly, the echo canceller acts as a distortion measuring circuit.

The output of the digital echo canceller 314 minus any far-end signal represents a canceller error signal 315. This canceller error signal 315 is a measure of system distortion or quality. A relatively large magnitude for the echo canceller error signal 315 is an indication of poor quality and distortion. The echo canceller error signal 315 may be used in a feedback path to adjust the flux canceller signal 303 and thereby improve signal quality by driving distortion to a minimum.

The improvement of the signal quality may be accomplished by using the canceller error signal 315 of the combination echo canceller 308 as a detected quality signal, and monitoring it with a flux controller 320. The flux controller 320 uses the detected quality signal to furnish a flux canceller signal 303 to the summer 302. The flux canceller signal 303 is the source for injecting a flux-canceling DC current into equipment-side winding N4. The flux canceller signal 303 is generated in accordance with the programming of the flux controller 320.

In the simplex mode, the transceiver 100 adjusts the flux canceller signal 303 when the local transmitter is active and the far-end signal is silent. When the far-end signal is silent, the detected quality signal is directly related to the undesired signal. One measure of the undesirable signal is determined by calculating the average magnitude of the detected quality signal over a group of samples. Those skilled in the art will recognize that alternative measures of the undesirable signal, such as the RMS value of the detected quality signal, could be used without departing from the scope of the present invention. Any method for determining a measure of the undesired signal may be used that is associated with the generation of the correcting flux. Upon determining a magnitude of the undesirable signal, then the flux canceller signal 303 is determined in accordance with an adjustment algorithm 400 as shown in FIG. 4.

Figure 4:
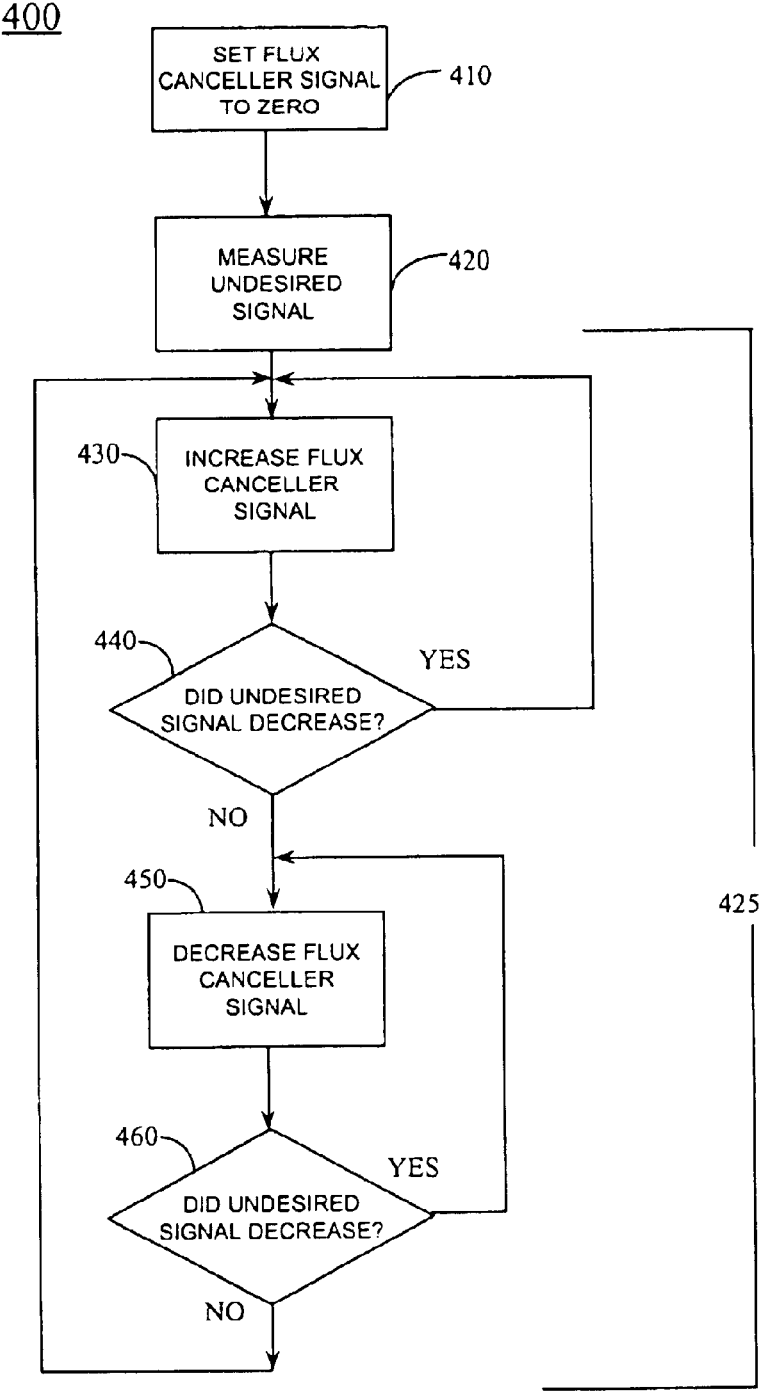
FIG. 4 is a flow chart illustrating a first flux cancellation algorithm in accordance with the present invention.

Referring now to FIG. 4, a first step 410 is to initialize the flux canceller signal. In the preferred embodiment, this initializing step 410 sets the canceller signal to zero. Next, the undesired signal is measured (step 420) to provide a baseline value. The process continues by repeatedly changing and monitoring the flux canceller signal (step 425) to minimize the error signal. This changing and monitoring step 425 may be performed by increasing (step 430) the flux canceller signal 303 (FIG. 3) to modify the distortion caused by the transformer. The system will then compare (step 440) the increase-modified canceller error signal against the baseline value. If the increase in the flux canceller signal 303 reduces the undesired signal or canceller error signal 315, the system will attempt another increase of the flux canceller signal 303 to obtain additional reductions in the error signal 315. However if the undesired signal becomes larger and the distortion has increased, and the system will decrease (step 450) the flux canceller signal 303. The system will then compare (step 450) the decrease-modified canceller error against the current baseline value. If a reduction of the undesired signal is obtained, the step 450 of decreasing the flux canceller signal is repeated. This process is repeated until there is no further decrease in the undesired signal. The algorithm 400 then returns to step 430 to attempt additional reductions in the undesired signal. In the flow chart, the increase step 430 moves the flux canceller signal 303 in a positive direction and the decrease step 450 moves the flux canceller signal 303 in a negative direction.

The magnitude of increases and decreases in the flux canceller signal 303 may be varied. Typically, a range of positive and negative values of the flux canceller signal 303 is required to accommodate a range of flux imbalances. The flux canceller signal 303 may be also adjusted during full duplex transmission when the far-end signal is present; however, a different measure of signal quality may be required. In both transmission modes (simplex or full duplex), a quality measure related the amount of undesired signal is required and the flux canceller signal 303 is adjusted in accordance with the detected quality signal to minimize the undesired signal.

The adjustment procedure is also used beneficially to compensate for offset voltages that might be present at the output of the driver amplifier 206 shown in FIG. 3. If such an offset voltage is present, the offset voltage would cause a non-zero DC flux density in the transformer even if the line side currents and turns ratios were perfectly balanced. The system of this invention will detect these errors and generate a corresponding signal correction for the system.

Figure 5:
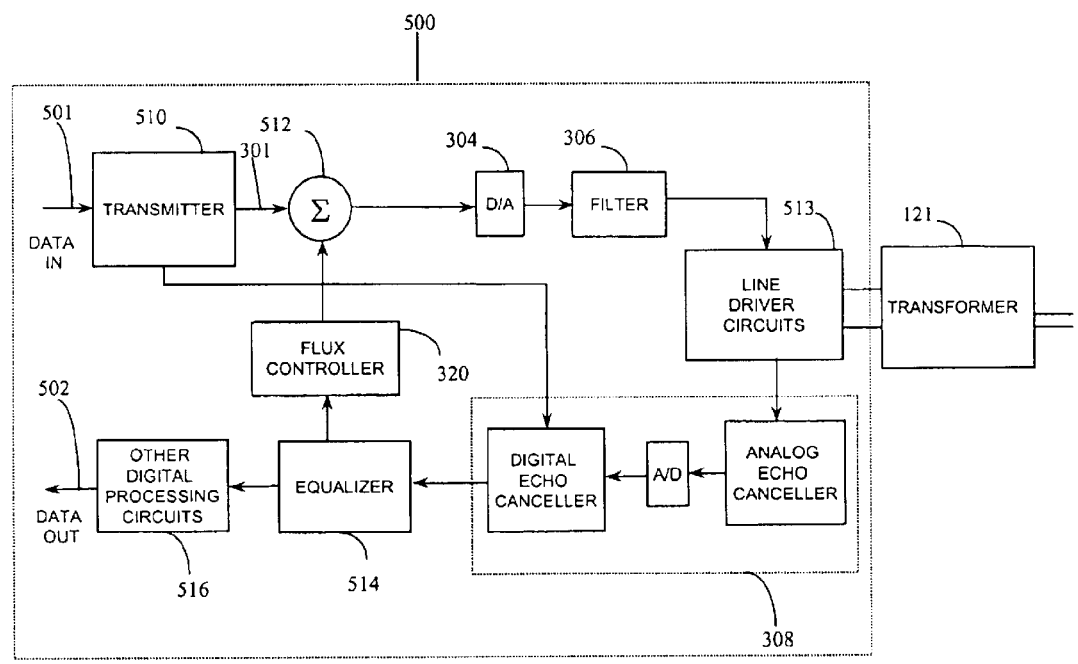
FIG. 5 is a schematic and block diagram of a second embodiment of an apparatus for flux cancellation in accordance with the present invention.

FIG. 5 is a block diagram of a transceiver 500 for full-duplex transfer of data in accordance with the present invention. Both input data 501 and output data 502 are handled by this transceiver 500. Input data 501 is sent from the central location to the remote location and a signal from the remote location results in output data 502.

The input data 501 is supplied to the transmitter 510. The output of transmitter 510 is a digital transmit signal and is combined with the flux canceller signal from flux controller 320 by digital summer 512. The transceiver 500 then operates in a similar manner to the previously described embodiment for transmitting the signal. The output of the summer summer 512 goes through a D/A converter 304 and a filter 306 to a line driver circuit 513. On the receiving end, the combination echo canceller 308 provides a signal to an equalizer 514. Summer 512, D/A converter 304, filter 306, and line driver circuit 513 function together as a flux generator. The equalizer 514 has an equalizer error signal used as the detected quality signal that is equivalent to the canceller error signal minus the output data signal. The arrangement for generating this type of signal is well-known to those skilled the design of data communications transceivers. One technique for providing the detected quality signal is to apply the output of equalizer 514 to a decision device which generates the constellation point closest to the equalizer output. The difference between the equalizer output and the decision device output is the detected quality signal. The detected quality signal is used a measure of quality and is provided as an input to the flux controller 320. An RMS value or average magnitude of the detected quality signal over N samples may now used as the measure of quality. The lower the value of the average magnitude, $Q_i$, the smaller the value of the distortion.

Figure 6:
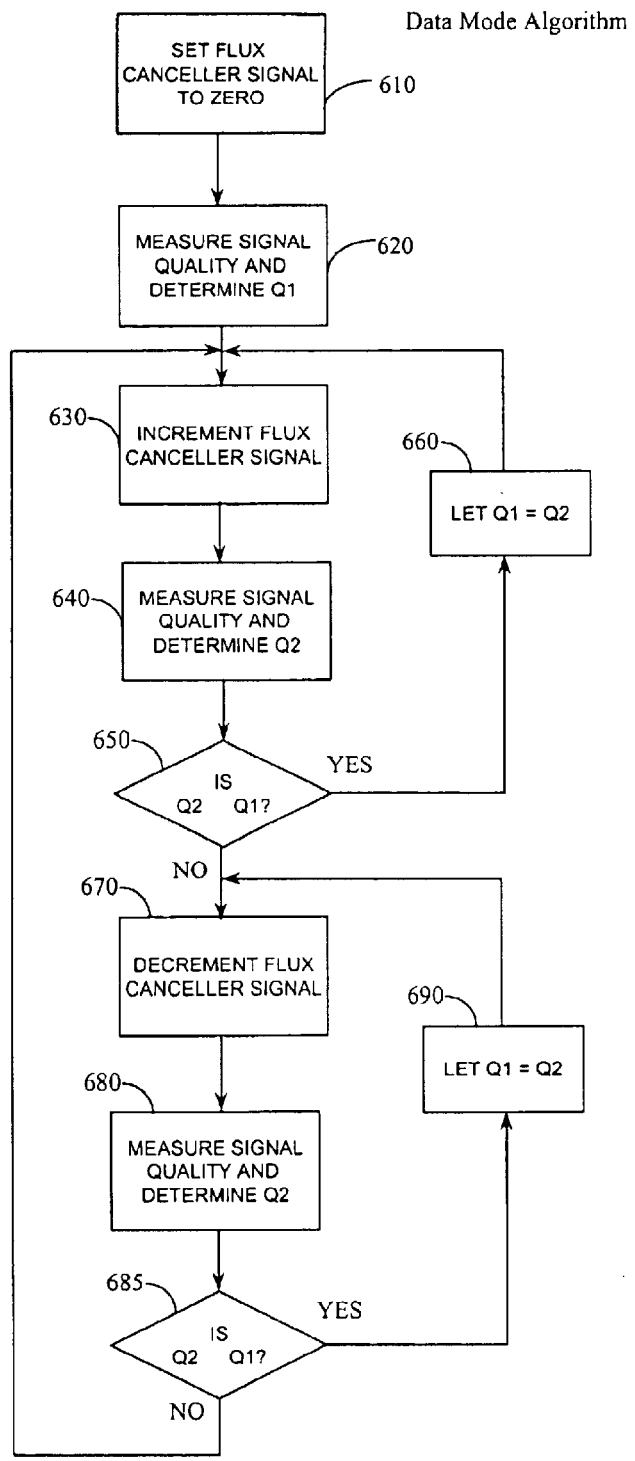
FIG. 6 is a flow chart illustrating a second flux cancellation algorithm in accordance with the present invention.

A second algorithm utilizing the reduction in $Q_i$ in accordance with the present invention is shown in FIG. 6. The flux canceller signal is initialized at step 610 and, in the preferred embodiment, is set to zero. At step 620, the signal quality is determined and saved as $Q_1$. The flux canceller signal is then incremented (step 630) and a new measure of quality is made (step 640) and saved as $Q_2$. The two measures, $Q_1$ and $Q_2$, are then compared (step 650) and if the quality is improved then $Q_1$ is set (step 660) to be equal to $Q_2$ and steps 630 through 650 are repeated. If the comparison step 650 shows that quality has not improved, then the flux canceller signal is decremented (step 670), and a quality measurement (step 680) is made. The two measures, $Q_1$ and $Q_2$, are then compared again (step 685) and if the quality is improved then the $Q_1$ is set at step 690 to be equal to $Q_2$ and steps 670 through 685 are repeated. If no improvement is made, then the program returns to step 630 to begin the correction process again.

Figure 7:
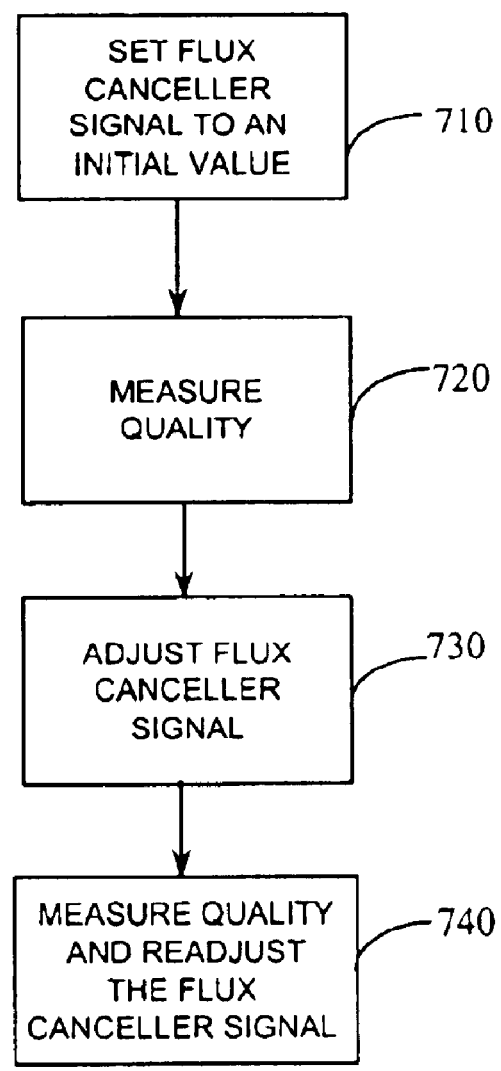
FIG. 7 is a flow chart illustrating a method for flux cancellation in accordance with the present invention.

FIGS. 4 and 6 each describe flux canceller algorithms for generating the flux canceller signal in accordance with the present invention. Those skilled in the art would appreciate that any measure of quality could be used to provide the flux canceller signal. FIG. 7 describes the overall method of the present invention. The flux canceller signal is set (step 710) to an initial value, typically zero. In step 720 a quality measurement is made and the flux canceller signal is adjusted (step 730). The flux canceller signal is then measured and readjusted (step 740) in response to the changes in quality in accordance to a flux canceller algorithm.

Although there have been described particular embodiments of the present invention of an apparatus and method for reducing flux imbalance distortion in a high speed communications system, it is not intended that such embodiments be construed as limitations upon the scope of the invention except as set forth in the following claims.

What is claimed is:

1. In a data communications system using a power feeding arrangement with a coupling transformer having an equipment side winding and a line side winding, an apparatus for reducing signal distortion caused by a flux imbalance associated with the transformer comprising:
   a. a distortion monitoring circuit having a monitoring input coupled to the equipment side winding of the coupling transformer and operative to generate at an error output an error signal corresponding to measurements of the signal distortion sampled by the monitoring circuit;
   b. a flux controller having a control input in electrical communication with the error output of the distortion monitoring circuit and operative to generate at a control output a flux cancellation signal in response to the error signal; and
   c. a flux generator having a first generator input in electrical communication with the control output of the flux controller and a generator output in electrical communication with the equipment side winding of the coupling transformer, the flux generator responsive to the flux cancellation signal to generate a cancellation flux to reduce the flux imbalance.

2. The apparatus of claim 1 wherein the distortion monitoring circuit comprises an echo canceller.

3. The apparatus of claim 1 wherein the distortion monitoring circuit further comprises an equalizer circuit electrically connected between the echo canceller and the control input.

4. The apparatus of claim 2 wherein the echo canceller comprises a combination of an analog echo canceller, an analog to digital converter, and a digital echo canceller operatively connected in logical sequence between the equipment side winding of the coupling transformer and the control input of the flux controller.

5. The apparatus of claim 1 wherein the flux generator comprises a signal summer having a second input connected to a transmit signal.

6. The apparatus of claim 5 wherein the signal summer is a digital summer and the flux generator further comprises a digital to analog converter connected between the digital summer and an analog filter.

7. The apparatus of claim 6 wherein the flux generator further comprises a line driver circuit operatively connected between the analog filter and the equipment side winding of the coupling transformer.

8. The apparatus of claim 7 wherein the line driver circuit comprises an amplifier.

9. The apparatus of claim 1 wherein the distortion monitoring circuit and flux controller are operative to measure a plurality of samples of the signal distortion and to vary the error signal and flux cancellation signal in response to measured changes in the samples of the distortion signal.

10. A flux imbalance compensator for a data communication system having a transmit signal and a coupling transformer with an associated flux imbalance, the compensator comprising:
    a. a signal quality monitor circuit electrically connected to the transformer and operative to detect the flux imbalance associated with the transformer and to generate a detected quality signal;
    b. a flux cancellation signal generator electrically connected to the signal quality monitor circuit and operative to receive the detected quality signal and generate a flux cancellation signal in response thereto;
    c. a signal summer for generating a transformer signal by combining the input data signal and the flux cancellation signal; and
    d. a line driver circuit coupled to the transformer for receiving the transformer signal and generating a cancellation flux to reduce the flux imbalance.

11. The flux imbalance compensator of claim 10, the line driver circuit comprising an amplifier connected between the signal summer and the flux generator for amplifying the transformer signal.

12. The flux imbalance compensator of claim 10 further comprising an analog filter operatively connected between the signal summer and the line driver circuit.

13. The flux imbalance compensator of claim 10, the signal quality monitor including an analog canceller.

14. The flux imbalance compensator of claim 10 wherein:
    a. the transmitter signal comprises a digital transmit signal;
    b. the signal summer includes a digital signal summer for receiving and combining a digital cancellation signal and the digital transmit signal to create a combined digital signal, and a digital to analog converter to convert the combined digital signal into the transformer signal;
    c. the signal quality monitor includes an analog to digital converter connected to a digital echo canceller and operative to convert the transformer signal from analog to digital format, the digital echo canceller also connected to the digital input data signal, wherein the signal quality monitor monitors the transformer signal and the digital transmit signal to produce the detected quality signal including a digital detected quality signal as an output of the digital echo canceller; and
    d. the cancellation signal generator processes the digital detected quality signal to generate the cancellation signal including the digital cancellation signal.

15. A circuit associated with a data transmission system for reducing a flux imbalance associated with a transmit signal sent through a power feeding transformer comprising:
    a. an echo canceller for generating a canceller error signal;
    b. a flux controller in electrical communication with the echo canceller and operative to monitor the canceller error signal and to generate a responsive flux canceller signal;
    c. a signal combiner for summing the transmit signal with the flux canceller signal to form a transformer input signal; and d. a winding in the transformer for receiving the transformer input signal and generating a flux to reduce the flux imbalance.

16. The circuit of claim 15 further comprising a signal amplifier electrically connected between the signal combiner and the winding.

17. The circuit of claim 16 further comprising an analog filter electrically connected between the signal combiner and the signal amplifier.

18. The circuit of claim 17 further comprising a digital to analog converter electrically connected between the analog filter and the signal combiner.

19. The circuit of claim 15, the echo canceller including an analog echo canceller.

20. The circuit of claim 19, the echo canceller further including an analog to digital converter electrically connected to an output of the analog echo canceller and a digital echo canceller electrically connected an output of the analog to digital converter.

21. The circuit claim 15 wherein the echo canceller includes a digital echo canceller.

22. A device for reducing an unwanted flux in a duplex data transmission system sending a digital transmit signal having a near end signal and a far end signal through a transformer comprising:
   a. a digital summer for combining a digital flux cancellation signal with the digital transmit signal to form a digital combination output signal;
   b. a digital to analog converter for converting the digital combination output signal into an analog combination output signal;
   c. a line driver circuit for powering transmission of the analog combination output signal through the transformer and thereby generating a flux to offset the unwanted flux and receiving a return signal including a flux from the transformer;
   d. an echo canceller for canceling the near-end signal so that only the far-end signal remains, the echo canceller including an analog echo canceller connected to a digital echo canceller through an analog to digital converter, the digital echo canceller operative to generate a digital error signal;
   e. an equalizer for separating the far end signal from the digital error signal; and
   f. a flux controller for receiving the digital error signal and generating the digital flux cancellation signal.

23. A method for reducing distortion associated with a flux imbalance in a coupling transformer used in a power feeding arrangement for a data communication system, the method comprising the steps of:
   a. measuring the distortion to obtain an error signal;
   b. generating a flux cancellation signal from the error signal;
   c. using the flux cancellation signal to generate a compensating flux signal; and
   d. applying the compensating flux signal to the transformer to reduce the flux imbalance.

24. A method for offsetting an undesired signal in a data transmission system sending a digital transmit signal through a transformer comprising:
   a. setting a flux canceller signal to an initial value;
   b. obtaining a first measurement of the undesired signal in the transformer;
   c. making a first adjustment of the flux canceller signal from the initial value according to the first measurement of the undesired signal;
   d. generating a flux offset signal in response to the first adjustment of the flux canceller signal;
   e. combining the flux offset signal with the digital transmit signal;
   f. obtaining a second measurement of the undesired signal and comparing the second measurement with the first measurement; and
   g. making a second adjustment of the flux canceller signal in accordance with the comparison between the first and second measurements of the undesired signal.

25. A method for multiple signal adjustment to offset an undesired signal in a data transmission system sending a transmit signal through a power feeding transformer comprising:
   a. initializing a flux canceller signal value;
   b. measuring a signal quality to determine properties of the undesired signal;
   c. modifying the flux canceller signal value in accordance with the measurement of the signal quality;
   d. generating an offset flux in accordance with modification of the flux canceller signal value;
   e. combining the offset flux with the transmit signal; and
   f. repeating the steps of measuring, modifying, generating, and combining until the measured signal quality reaches a pre-determined threshold.

26. In a simplex power arrangement of a data communications system having a transceiver with a transmit signal and further having an echo canceller providing an error signal responsive to nonlinearities caused by flux imbalance in a coupling transformer, an apparatus comprising:
   a. a flux controller for generating a flux canceller signal in response to the error signal and in accordance with a flux cancellation algorithm;
   b. a signal summer for combining the transmit signal and the flux canceller signal; and
   c. an amplifier coupled to the summer, the amplifier providing an output signal to a winding on a transceiver side of the transformer.

27. In a simplex power arrangement of a data communications system having a transceiver generating a transmit signal and further having an echo canceller having an error signal responsive to flux imbalances associated with a coupling transformer in the system, a method for canceling signal nonlinearities caused by the flux imbalances comprising the steps of:
   a. measuring the error signal;
   b. adjusting a flux canceller signal to a new value based on the measurement of the error signal;
   c. re-measuring the error signal; and
   d. readjusting the flux canceller signal in accordance with a flux cancellation algorithm.

* * * * *